CHARLES ALDEN.
Improvement in Process and Apparatus for Drying and Preserving Animal and Vegetable Substances.
No. 121,569. 
2 Sheets--Sheet 1.
Patented Dec. 5, 1871.
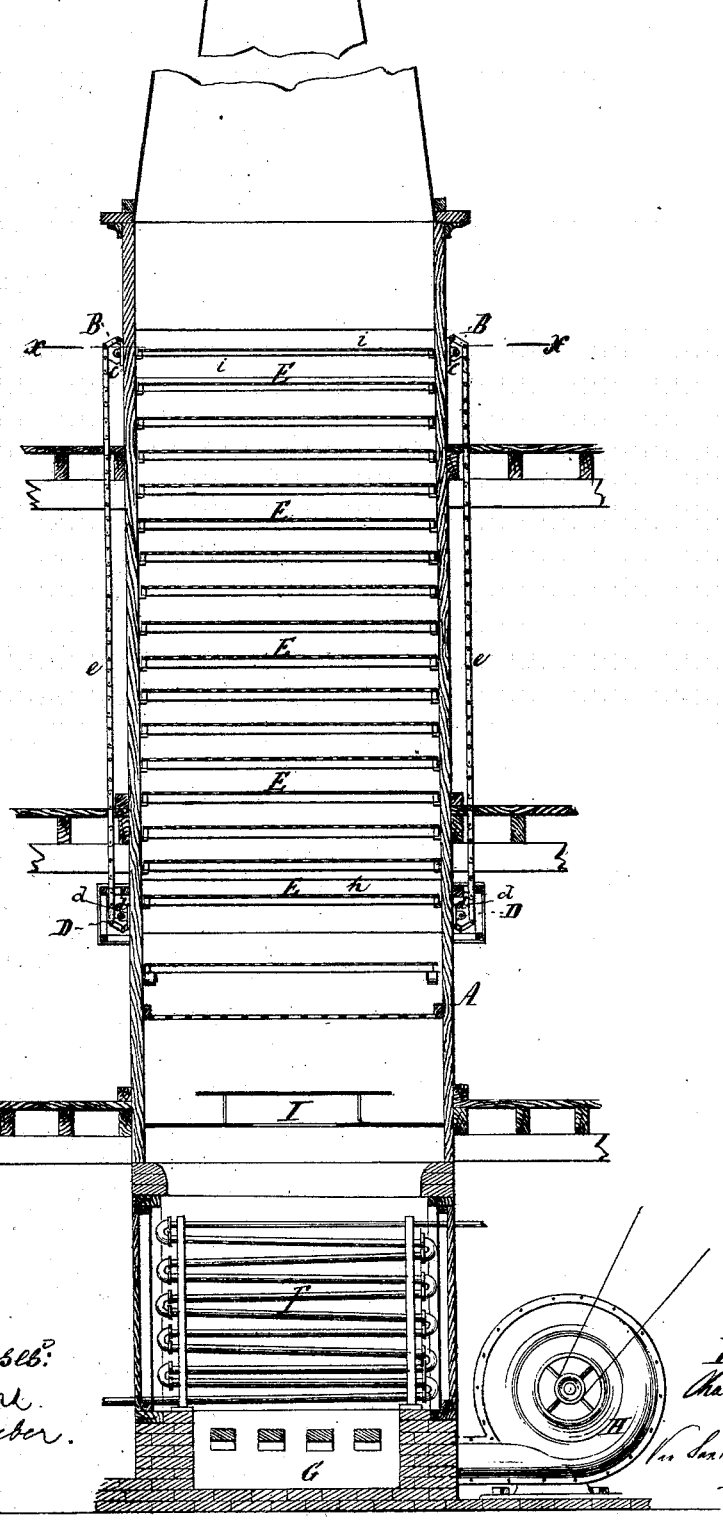

CHARLES ALDEN.
Improvement in Process and Apparatus for Drying and Preserving Animal and Vegetable Substances.
No. 121,569. Patented Dec. 5, 1871.
2 Sheets--Sheet 2.
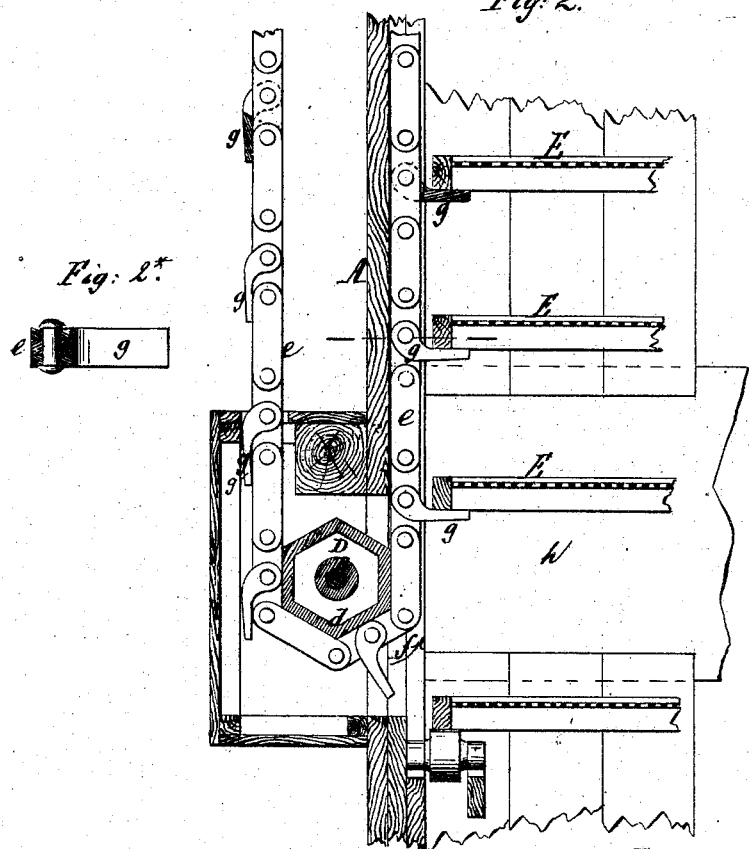
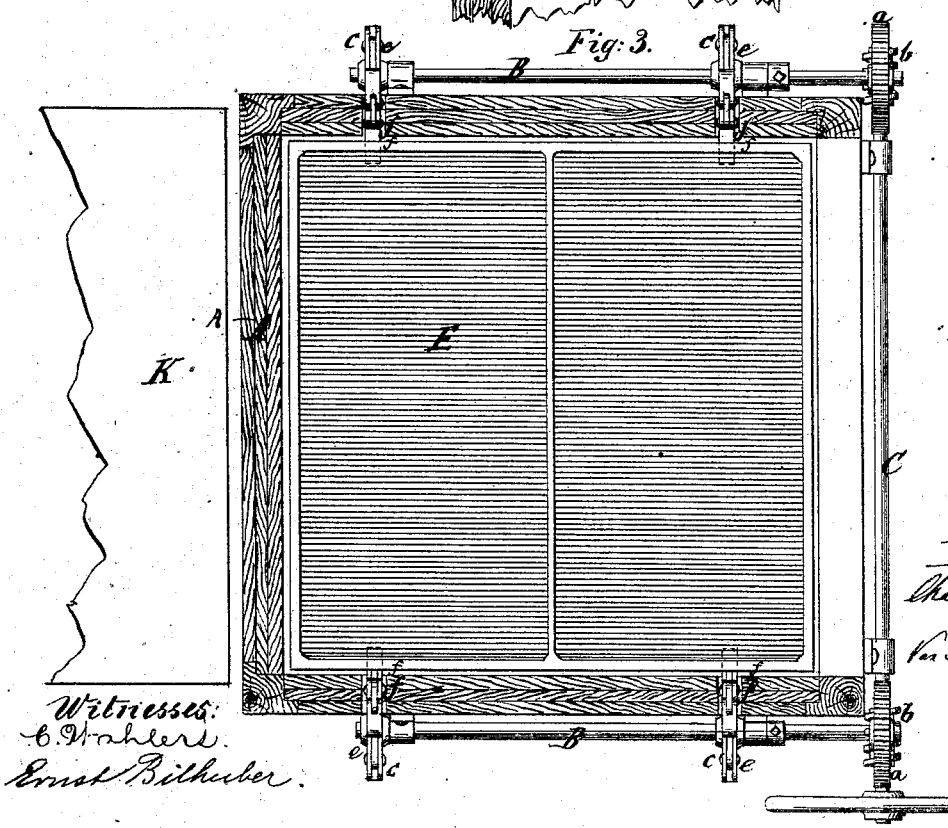

121,569

UNITED STATES PATENT OFFICE.

CHARLES ALDEN, OF NEWBURG, NEW YORK.

IMPROVEMENT IN PROCESSES AND APPARATUS FOR DRYING AND PRESERVING ANIMAL AND VEGETABLE SUBSTANCES.

Specification forming part of Letters Patent No. 121,569, dated December 5, 1871.

*To all whom it may concern:*

Be it known that I, CHARLES ALDEN, of Newburg, in the county of Orange and State of New York, have invented a new and useful Improvement in Treating Animal and Vegetable Substances so as to Dry and Preserve them; and I do hereby declare the following to be a full, clear, and exact description thereof, which will enable those skilled in the art to make and use the same, reference being had to the accompanying drawing forming part of this specification, in which drawing—

Figure 1 represents a vertical section of the apparatus which I use in carrying out my invention. Fig. 2 is a partial section of the same. Fig. 3 is a horizontal section of the same in the plane *x x*, Fig. 1.

Similar letters indicate corresponding parts.

This invention consists, substantially, in the application to substances treated of an air-blast characterized by certain degrees or stages of humidity, temperature, and force, so adapted as to effect simultaneously the following results:

First, chemically: An artificial maturing of the amylaceous contents of the material treated to saccharine matter, so far as practicable, together with a fixation or chemical binding of as much moisture as possible in the condition known to chemists as hydrate, in which it can be no longer an agent of fermentation or decay.

Second, mechanically: The evaporation of the water not chemically fixed as hydrate with a rapidity accelerated by the warm and humid blast in such a peculiar manner as to exhaust the water simultaneously and equally from all parts of the material treated without impairing the texture and other properties of the material by undue heat or by parching dryness of air; without driving off the fixed water, essence, and aroma; without reducing amylaceous or saccharine ingredients to gum or caramel; and without incrusting or hardening the material to the condition described by the terms "dried" or "desiccated."

Third, economically: A product proof against decay or change; enhanced in ripeness, sweetness, richness, and solubility; characterized by its natural structure, color, and fresh aroma; and, by virtue of the fixed moisture or hydrate occupying its pores, incapable of being, on the one hand, penetrated and injured, as dried substances are, by the moisture of damp weather or damp places or climates, or, on the other hand, of being reduced in a dry atmosphere to a parched and brittle consistency, excepting in the case of substances, such as esculents, replete with amylaceous or silicious matter, which necessarily assume a brittle consistency when exhausted of free moisture.

The process whereby these results are effected is, in general terms, as follows: An elongated chamber or shaft is provided, square, oblong, or other form in cross-section, and set vertically, as shown in the drawing, or in any other position found advantageous for particular purposes. This may be designated as the pneumatic shaft. In one end of this pneumatic shaft is placed a steam-coil, the pressure and heat in which are regulated to suit the product in hand. Next the steam-coil is placed a deflector to distribute the air-blast more uniformly throughout the shaft. This may be adapted to hold a deposit of water, which is sometimes desirable, for giving a degree of humidity to the air-blast at its first entrance to the shaft; or deposits of water may be arranged at other points and in former modes to supply the humidity, which is an essential element in the process which I claim to have invented as an improvement on all former modes of preserving organic products employed by myself or others. Behind or beneath the steam-coil is an air-chamber, into which air is forced by a suitable apparatus, such as a fan-blower. The material under treatment, having been first divided so as to expose the most extended surface possible to the action of the pneumatic apparatus, is spread on a screen, and may be introduced into the pneumatic shaft at the end near the steam-coil. After remaining here exposed to the blast for a suitable time, according to its nature, it is passed onward by a movement of the carrying apparatus on which it rests, and a fresh screen (or screens) is introduced into the place thus vacated. The blast in passing through these screens covered with fresh material now carries with it an increased burden of moisture derived from them as it strikes upon the screens that have gone on before. With every forward movement of the carrying apparatus fresh screens are introduced, and the moisture of the blast is increased by them. When the pneumatic shaft is filled with the series of loaded screens they begin to be taken out at the terminus of the shaft in a perfect condition of the material as fast as the crude material is introduced at the entrance. The process is now in full operation. The blast, which enters the shaft with a slight degree of humidity and a temperature of from 175° to 200° Fahrenheit, according to the article, gains moisture and loses heat at every loaded screen through which it passes, and finally leaves the perfected material at the terminus, reduced in temperature to say 100°, and yet throughout its progress does not cease to act at once as a hydratic mediator in the conversion of the amylaceous ingredients to grape sugar, and also as a mechanical evaporator and absorbent, with such effect that the amount of free moisture left in the material at the terminus is of no practical consequence and never produces fermentation or decay.

This novel discovery I here claim in distinction from my process formerly patented, namely: That of employing humidity and even of increasing humidity as an auxiliary both to supermaturation and evaporation, carrying the material forward, if preferred, in the same direction with the air-blast, and perfecting the material in that stage of the blast when it (the blast) has most humidity and least heat, instead of finally drying it off, as was formerly thought necessary, at the dryest and hottest (initial) stage of the blast, with the result, by the new process, of not only perfect evaporation with perfect security against decay or change, aided by humidity of the blast—a result heretofore unexpected, incredible, and, therefore, an important scientific and practical discovery—but also with the further novel and important discovery of a supermaturation or artificial ripening of organic matter from amylaceous to saccharine under the stimulus of the tepid, humid, and rapid pneumatic blast. The product comes out, in these circumstances, fresh, intact in its most delicate tissues, soft, pliable, rich, sweetened, very soluble, and incapable of decay or change by lapse of time or change of climate.

In the drawing, A designates a tunnel or tower, the cross-section of which is square or oblong, as shown in Fig. 3. On two sides of the tower are placed shafts B B, which have their bearings in suitable journal-boxes fastened to the tower, and on the ends of which are mounted worm-wheels $a$ $a$, which engage with endless screws or worms $b$ $b$ mounted on the driving-shaft C. On the shafts B B are mounted chain-wheels $c$ $c$, and corresponding shafts D D with chain-wheels $d$ $d$ are secured to the sides of the tower at a suitable distance—say twenty feet, more or less—beneath the shafts B B. Over the chain-wheels $d$ $d$ are stretched chains $e$, the inner sections of which run in grooves $f$ cut in the sides of the tower, (see Figs. 2 and 3,) and which are provided with fingers $g$, connected to the chains by pivots, so that they turn out to a horizontal position inside of the tower, or that they turn down to a vertical position when outside of the tower, as shown in Fig. 2. In Fig. 2* I have shown a cross-section of the chain so as to explain the connection between the fingers $g$ and the links of the chain. In one of the sides of the tower A is an opening, $h$, through which the screens E are introduced, and each screen, on being inserted, is caught by four of the fingers $g$ and then carried up through the tower, the motion of said chains being in the direction of the arrow marked near them in Figs. 1 and 2. For the purpose of facilitating the operation of introducing the screens a table, K, is secured on the outside of the opening $h$, which table supports the screens so that they can be readily pushed into the tower. The opening $h$ can be closed by suitable doors. In the upper part of the tower is a discharge-opening, $i$, through which the screens are withdrawn after the same have traveled up to the top of the tower. In the bottom part of the tower is situated a steam-coil, F, which is supplied with steam from a suitable generator, and beneath this coil is an air-chamber, G, into which air is forced by means of a fan-blower, H, or any other suitable air-forcing apparatus. The air thus injected into the air-chamber rises up through the steam-coil, where it is heated to the requisite temperature before it comes in contact with the articles spread on the screens E. In order to distribute the air uniformly throughout the tower a deflector, I, is placed over the steam-coil, as shown in Fig. 1.

The tower A is generally made from sixteen to twenty feet high, and the movement of the chains is so regulated that it takes from two to three hours to raise a platform or tray from the bottom up to the top.

The temperature of the air in the lower part of the tower is from 190° to 200°, and as the air rises it gradually cools off, so that in the top part of the tower the temperature is from 120° to 130°. These temperatures are maintained in drying fruit, such as apples, peaches, tomatoes, &c.; but for other substances the temperature must be varied, as experience will dictate. For drying meat, for instance, the temperature may be slightly decreased, and it must not rise above 150° in the bottom part of the tower.

By introducing the green articles in the bottom part of the tower and moving them in the same direction in which the air moves I gain a great advantage, since the air, on coming in contact with the green articles, takes up a quantity of moisture, and as the air rises the quantity of moisture taken up by it constantly increases, while, at the same time, the moisture contained in the articles spread on the successive screens constantly decreases. By this process the skin of the articles to be dried is prevented from becoming hard and said articles are thoroughly and uniformly dried; while I have found that when the screens are introduced at the top of the tower and moved against the current of the air the skin of the articles to be dried becomes hard and the interior of said articles is imperfectly dried. This disadvantage I have partly overcome by introducing into the bottom part of the tower, above the steam-coil, shallow pans containing water or the moist skins and cores of the fruits to be dried, so that the air, before coming in contact with the articles to be dried, takes up some moisture; but by doing so the process of drying is retarded.

What I claim as new, and desire to secure by Letters Patent, is—

1. The within-described process of maturing and preserving animal and vegetable substances, in part through evaporation and in part through chemical binding of their organic moisture, by exposing the same to a blast of heated and humid air, increasing in humidity and decreasing in heat as the evaporation proceeds, or screens moving in a tunnel or tower, said current of air moving in the same direction with the screens containing the articles to be treated, substantially as herein set forth.

2. The arrangement of a fan-blower, H, air-chamber G, heating-coil F, and tunnel A containing a series of rising-and-falling screens, E, substantially as shown and described.

CHARLES ALDEN.

Witnesses:
W. HAUFF,
E. F. KASTENHUBER. (48)